(12) United States Patent
Li

(10) Patent No.: US 11,221,508 B2
(45) Date of Patent: Jan. 11, 2022

(54) ADAPTIVE HARMONIC DIFFRACTIVE LIQUID CRYSTAL LENS AND METHOD OF MAKING AND USE THEREOF

(71) Applicant: Guoqiang Li, Upper Arlington, OH (US)

(72) Inventor: Guoqiang Li, Upper Arlington, OH (US)

(73) Assignee: Versatile Research LLC, Upper Arlington, OH (US)

( * ) Notice: Subject to any disclaimer, the term of this patent is extended or adjusted under 35 U.S.C. 154(b) by 0 days.

(21) Appl. No.: 16/265,978

(22) Filed: Feb. 1, 2019

(65) Prior Publication Data

US 2020/0033666 A1 Jan. 30, 2020

Related U.S. Application Data

(60) Provisional application No. 62/624,897, filed on Feb. 1, 2018.

(51) Int. Cl.
*G02F 1/1335* (2006.01)
*G02F 1/1333* (2006.01)
*G02B 5/18* (2006.01)

(52) U.S. Cl.
CPC ..... *G02F 1/133504* (2013.01); *G02B 5/1876* (2013.01); *G02F 1/133365* (2013.01)

(58) Field of Classification Search
CPC .................................. G02F 1/133504
See application file for complete search history.

(56) References Cited

U.S. PATENT DOCUMENTS 8,154,804 B2 * 4/2012 McGinn ................. G02C 7/083
359/666

FOREIGN PATENT DOCUMENTS

| CN | 1498353 A | * | 5/2004 | ....... G02F 1/134309 |
| WO | WO-2010147664 A1 | * | 12/2010 | ............... G02F 1/29 |
| WO | WO-2011153158 A1 | * | 12/2011 | ........... A61B 5/0031 |

OTHER PUBLICATIONS

Li et al, "Large-aperture harmonic diffractive adaptive liquid crystal lens for vision care", Optics in the Life Sciences (Year: 2015).*

* cited by examiner

*Primary Examiner* — Charlie Y Peng

(57) ABSTRACT

Disclosed herein, in accordance with some aspects of the present disclosure, are adaptive harmonic diffractive liquid crystal lenses and methods of making and use thereof.

19 Claims, 6 Drawing Sheets

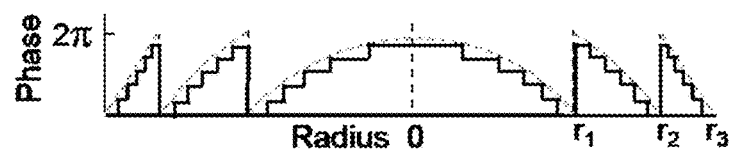
Figure 2A
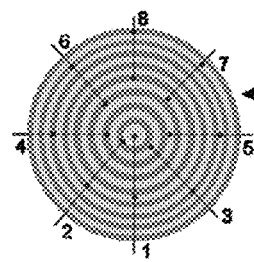
Figure 2B
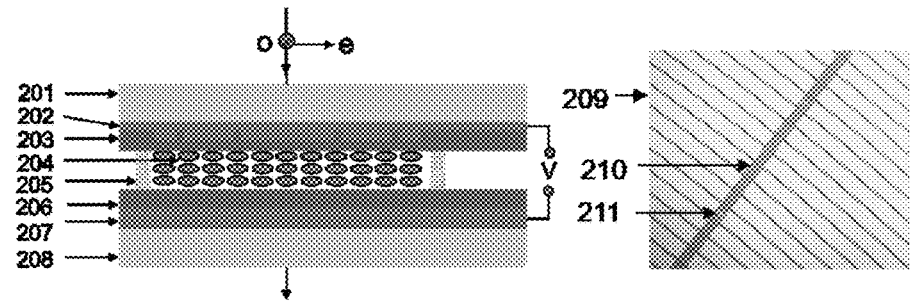
Figure 2C
Figure 2D

ADAPTIVE HARMONIC DIFFRACTIVE LIQUID CRYSTAL LENS AND METHOD OF MAKING AND USE THEREOF

BACKGROUND

Ophthalmic lenses have stringent requirements, including high light efficiency, relatively large aperture, fast switching, low driving voltage, and power-failure-safe configuration. None of the current lenses satisfy these requirements simultaneously. Different structures for liquid crystal adaptive lenses have been suggested for various applications, e.g., by filling empty lens shaped cavities with liquid crystals[31-33] or by sandwiching liquid crystals between planar electrode plates[34-48] and generating a refractive index gradient. The latter permits a power-failure-safe configuration for driving and thinner liquid crystal layers with fast switching, both of which are critical for ophthalmic lenses. However, the apertures of those lenses are not large enough (smaller than 5 mm in diameter), high working voltages are required, or the liquid crystal layer is still relatively thick, which significantly increases the response time. For refractive lenses, the focal length is $f=r^2/(2*OPD)$,[26] where r is the radius of the lens, OPD is the optical path difference and equal to $\Delta n*d$ ($\Delta n$ is the tunable refractive index change or birefringence, and d is the thickness).

To maintain acceptable response time for vision correction, d should not be more than 15 μm. Even using the highest $\Delta n$ parameter for a known liquid crystal ($\Delta n=0.36$), the refractive liquid crystal lenses cannot meet the fundamental requirement for eyeglass. The diffractive structure allows relatively large aperture. A few binary liquid crystal zone plates have been demonstrated, but the light efficiency is too low for ophthalmic lenses. High efficiency switchable diffractive lenses have been developed, but the concept of conventional diffractive (CD) lenses puts limits on the implementation. Based on the limitations imposed by conventional diffractive lenses, further development of liquid crystal lenses is needed. The adaptive harmonic diffractive liquid crystal lenses and methods described herein address these and other needs.

SUMMARY

The present disclosure relates, in some aspects, to adaptive harmonic diffractive liquid crystal lenses and methods of making and use thereof.

In one aspect, present disclosure relates to a system for correction of vision of a subject. In one embodiment, the system includes: a lens having a linearly modulated phase profile and a plurality of zones, wherein each of the zones comprises contact ring electrodes, and wherein the lens is configured as a diffractive liquid crystal lens. In some embodiments, the vision correction provided by the system is correction of presbyopia.

In some embodiments, two contact ring electrodes are located at the boundary of each zone. In some embodiments, each contact ring electrode is located proximate the boundaries of neighboring subzones of respective zones. The contact ring electrodes can, for example, be configured to have low resistance. In some embodiments, the contact ring electrodes can be covered by a high-resistance material to create a sheet resistance and generate linear voltage drops. In some embodiments, the contact ring electrodes can be covered by a high-resistance Indium Tin Oxide (ITO).

In some embodiments, the lens can comprise inner zones with a plurality of linear sectors and outer zones with a plurality of linear sectors. The inner zones can, for example, each comprise eight or less linear sectors (e.g., 7 or less, 6 or less, 5 or less, 4 or less, 3 or less, or 2 or less). The outer zones can, for example, each comprise four or less linear sectors (e.g., 3 or less, or 2 or less).

In some embodiments, each of the zones can further comprise control electrodes. The control electrodes can, for example, be configured to have a high-resistance.

In some embodiments, linear phase modulation is performed in each zone of the lens. In some embodiments, the total phase change in each zone is a multiple of a radians.

The lens can, for example, comprise an aperture of about 20 mm or more (e.g., about 25 mm or more, about 30 mm or more, about 35 mm or more, about 40 mm or more, about 45 mm or more, or about 50 mm or more).

The lens can, for example, have a base optical power of about 0.5 D or more (e.g., about 1 D or more, about 1.5 D or more, about 2 D or more, about 2.5 D or more, about 3 D or more, about 3.5 D or more, about 4 D or more, about 4.5 D or more, about 5 D or more, about 5.5 D or more, or about 6 D or more). In some embodiments, the lens can have a base optical power of about 7.0 D or less (e.g., about 6.5 D or less, about 6 D or less, about 5.5 D or less, about 5 D or less, about 4.5 D or less, about 4 D or less, about 3.5 D or less, about 3 D or less, about 2.5 D or less, about 2 D or less, or about 1.5 D or less). The base optical power of the lens can range from any of the minimum values described above to any of the maximum values described above. For example, the lens can have a base optical power of from about 0.5 D to about 7.0 D (e.g., from about 0.5 D to about 4 D, from about 4 D to about 7 D, from about 0.5 D to about 2.5 D, from about 2.5 D to about 4.5 D, from about 4.5 D to about 7 D, or from about 1 D to about 6 D).

In some embodiments, a plurality of voltages can be applied to the contact ring electrodes to tune the optical power of the lens. For example, the plurality of voltages can be applied such that changing the slope of the applied voltage produces different positive and/or negative optical power of the lens. In some embodiments, nine voltages are applied to each contact ring electrode of each inner zone of the lens. In some embodiments, five voltages are applied to each contact ring electrode of each outer zone of the lens.

In another aspect, the present disclosure relates to a system for correction of vision of a subject which, in one embodiment, comprises: a lens having a linearly modulated phase profile, wherein the lens is configured as a diffractive liquid crystal lens; an eye tracking sensor configured to measure distance between a viewer and an object; a processor configured to determine, based on the measured distance, a desired optical power of the lens for the viewer to focus on the object; and a voltage generator configured to generate a voltage to apply to the lens to provide the desired optical power. In some embodiments, the lens, eye tracking sensor, processor, and voltage generator are disposed on and/or in wearable eyeglasses for the subject. The measured distance between the viewer and the object and desired optical power of the lens can, for example, correspond to near distance vision, intermediate distance vision, or long distance vision. In some embodiments, the eye tracking sensor, processor, and voltage generator are configured to, in combination, provide autofocus functions for correction of vision of the subject. In some embodiments, the eye tracking sensor comprises at least one light source and at least one image sensor, configured to obtain a back-reflected image from the pupil and cornea.

The details of one or more embodiments of the present disclosure are set forth in the accompanying drawings and the description below. Other features, objects, and advantages of the present disclosure will be apparent from the description and drawings, and from the claims.

BRIEF DESCRIPTION OF THE FIGURES

The accompanying drawings, which are incorporated in and constitute a part of this specification, illustrate embodiments and together with the description, serve to explain the principles of the disclosed technology:

FIGS. 2A-2D are schematics of a conventional diffractive liquid crystal (CDLC) lens concept. FIG. 2A (see "(a)" at top of Figure) shows that a multi-level quantization approximates the continuous quadratic blaze profile. FIG. 2B (see "(b)" in lower left of Figure) is a layout of the one-layer ring electrode pattern (two central zones shown) with the vias (dots) and the bus lines in different layers. FIG. 2C (see "(c)" in lower middle of Figure) is the structure of the liquid crystal lens. FIG. 2D (see "(d)" in lower right of Figure) shows a finished substrate with patterned ring electrodes, vias, and bus lines.

FIG. 4A (see "(a)" in Figure) is the verification of phase modulation of a single uniform cell; FIG. 4B (see "(b)" in Figure) is the linear phase modulation by using low-resistance ITO contact ring electrodes and high-resistance ITO control electrode; FIG. 4C (see "(c)" in Figure) is a schematic of the via and busline; FIG. 4D (see "(d)" in Figure) is a 30 mm patterned substrate.

FIG. 5A shows a prototype; FIG. 5B shows reflected images; FIG. 5C shows corresponding geometry; and FIG. 5D shows calibration targets.

DETAILED DESCRIPTION

Figure 1A:
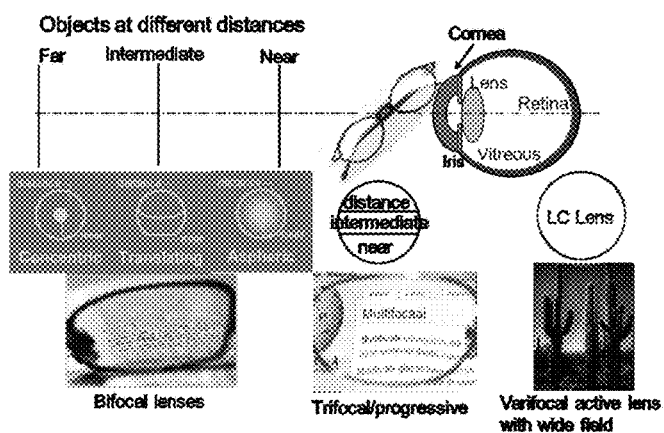
FIG. 1A shows the correction of presbyopia using conventional area-division multifocal lens and a varifocal liquid crystal (LC) lens with wide field for each vision task.

As will now be described in further detail, the present disclosure relates, in some aspects, to adaptive harmonic diffractive liquid crystal lenses and methods of making and use thereof.

Some references, which may include patents, patent applications, and various publications, are cited in a reference list and discussed in the disclosure provided herein. The citation and/or discussion of such references is provided merely to clarify the description of the present disclosure and is not an admission that any such reference is "prior art" to any aspects of the present disclosure described herein. All references cited and discussed in this specification are incorporated herein by reference in their entireties and to the same extent as if each reference was individually incorporated by reference.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

"Exemplary" means "an example of" and is not intended to convey an indication of a preferred or ideal embodiment. "Such as" is not used in a restrictive sense, but for explanatory purposes.

As used in the description and the appended claims, the singular forms "a," "an," and "the" include plural referents unless the context clearly dictates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the present disclosure. The identifiers "first" and "second" are not intended to imply any particular order, amount, preference, or importance to the components or steps modified by these terms.

A "subject" may be any applicable human or animal, and such references to a "subject" may relate particularly to vision and correction of impairments in vision of the human or animal.

The examples below are intended to further illustrate certain aspects of the present disclosure described herein, and are not intended to limit the scope of the claims.

EXAMPLES

The following examples are set forth below to illustrate implementations and results according to the present disclosure. These examples are not intended to be inclusive of all aspects of the present disclosure described herein, but rather to illustrate representative implementations and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize described process(es).

Example 1

Ophthalmic lenses have stringent requirements, including high light efficiency, relatively large aperture, fast switching, low driving voltage, and power-failure-safe configuration. None of the current, conventional lenses satisfy these requirements simultaneously. Different structures for liquid crystal adaptive lenses have been suggested for various applications, e.g., by filling empty lens shaped cavities with liquid crystals[31-33] or by sandwiching liquid crystals between planar electrode plates' and generating a refractive index gradient. The latter permits a power-failure-safe configuration for driving and thinner liquid crystal layers with fast switching, both of which are critical for ophthalmic lenses. However, the apertures of those lenses are not large enough (smaller than 5 mm in diameter), high working voltages are required, or the liquid crystal layer is still relatively thick, which significantly increases the response time. For refractive lens, the focal length is $f=r^2/(2*OPD)$, where r is the radius of the lens, OPD is the optical path difference and equal to $\Delta n*d$ ($\Delta n$ is the tunable refractive index change or birefringence, and d is the thickness). The most widely used nematic liquid crystal (NLC) E7 has $\Delta n=0.23$, and a nematic liquid crystal material with $\Delta n=0.36$ is available. To maintain acceptable response time for vision correction, d should not be more than 15 μm. Using this highest $\Delta n$ parameter ($\Delta n=0.36$), the largest possible size of the refractive liquid crystal lens for one-diopter (1 D), 2 D, 3 D, and 3.5 D is only 6.572 mm, 4.648 mm, 3.792 mm, and 3.514 mm, respectively. This means that refractive liquid crystal lenses cannot meet the fundamental requirement for eyeglass. The diffractive structure allows relatively large aperture. A few binary liquid crystal zone plates[49-51] have been demonstrated, but the light efficiency is too low for ophthalmic lenses.[52] Therefore, there exists a need for approaches that satisfy those requirements.

High efficiency switchable diffractive lenses have been developed.[26,53-62] One-diopter (1 D) and 2 D lenses with an aperture of 10-15 mm and 8 digital steps (8-level) phase modulation in each zone have been demonstrated, which meet the above requirements. The results indicate that liquid crystal lenses based on ring patterned electrodes provide better optical performance. However, the concept of conventional diffractive (CD) lenses (FIG. 2A) puts limits on the implementation—the conventional diffractive liquid crystal (CDLC) lens has a total of $2\pi$ phase change in each zone and it is natural that the width of each zone gets smaller from the center of the lens to the edge. The width of each subzone can become very small and this results in difficulty in fabrication and low diffraction efficiency when the width of the subzone is close to the thickness of the liquid crystal cell due to the fringing field effect.[26] For example, the width of the last subzone at the edge for each of the typical lenses needed for correction of presbyopia is shown in Table 1 for various diameters and powers. When the feature size is smaller than 5 μm, the difficulty in fabrication increases and the performance can be reduced. A conventional diffractive liquid crystal lens with 2-3 D power and an aperture larger than 20 mm (Table 1) cannot be achieved. According to the left side of Table 1, the conventional diffractive liquid crystal lenses with the last subzone width marked with an asterisk or any conventional diffractive liquid crystal lens with a 30 mm-diameter cannot be produced.

TABLE 1

The width of the last subzone for 8-level lenses with various diameters and powers and comparison between the conventional diffractive liquid crystal lens and the harmonic diffractive liquid crystal lens.

|  | Conventional diffractive (CD) liquid crystal lens | | Harmonic diffractive (HD) liquid crystal lens with $10\pi$ phase modulation | |
|---|---|---|---|---|
|  | 10 mm diameter | 20 mm diameter | 20 mm diameter smallest zone width | 30 mm diameter smallest zone width |
| 1 D | 13.75 μm | 6.94 μm | 281.61 μm | 185.10 μm |
| 2 D | 6.87 μm | 3.47 μm* | 139.80 μm | 92.84 μm |
| 3 D | 4.61 μm * | 2.31 μm* | 92.98 μm | 61.69 μm |
| 3.5 D | 3.96 μm * | 1.98 μm* | 79.64 μm | 52.93 μm |

The 8-level phase modulation of the conventional diffractive liquid crystal lens profile is achieved digitally by applying 8 different voltages to the patterned low-resistance transparent ITO (indium tin oxide) ring electrodes. Under this mechanism, an 8-level 1 D lens can be switched to a 4-level 2 D lens, but the light diffraction efficiency is reduced significantly (e.g., for a 10-mm diameter lens, the light diffraction efficiency can be reduced from above 90% to around 75%). Furthermore, the conventional diffractive lenses exhibit chromatic aberration.

Based on the limitations imposed by conventional diffractive lenses, further development of liquid crystal lenses is needed. In accordance with some embodiments of the present disclosure, large-aperture (30 mm and above) harmonic diffractive liquid crystal lens (HDLC lens) have optical power up to 3.5 D, and are described below in more detail.

Figure 3A:
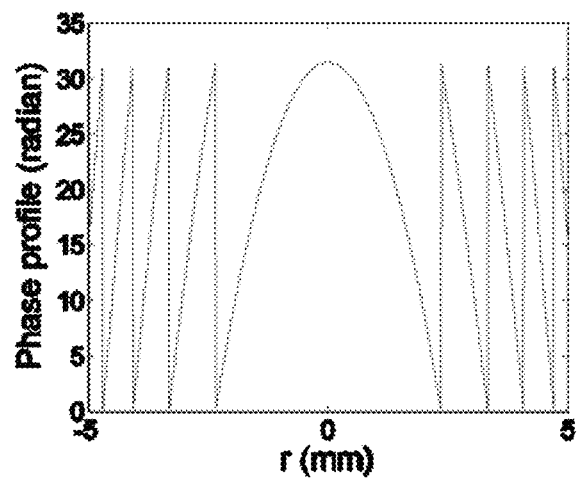
FIG. 3A is a schematic relating to a harmonic diffractive liquid crystal (HDLC) lens concept, which particularly illustrates an ideal phase profile with total phase change of $p*2\pi$ in each zone (p=5 in this example).

Described herein, in accordance with embodiments of the present disclosure, are tunable harmonic diffractive liquid crystal (HDLC) lenses which can overcome the above-mentioned problems. Also described herein is an approach to achieve linear rather than digital phase modulation. The harmonic diffractive lens is based on phase modulation of multiples of $2\pi$ radians. For the example shown in FIG. 3A, the total phase change in each zone is $10\pi$ radians. The harmonic diffractive liquid crystal lenses described herein allow for the design and fabrication of lenses with an aperture of 30 mm and various base power from 0.5 D to 7.0 D without bottleneck.

Figure 3B:
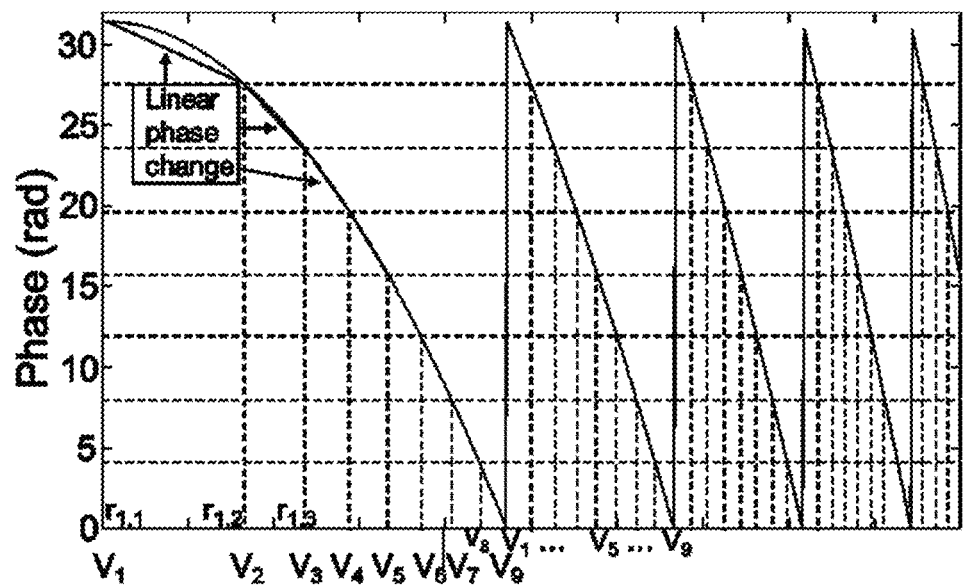
FIG. 3B is a schematic of a harmonic diffractive liquid crystal (HDLC) lens concept in accordance with the present disclosure. Linear phase generation by using nine or fewer 5 µm-wide low-resistance ring electrodes in each zone to apply voltages and these ring electrodes are covered by high-resistance ITO to generate linear voltage drops.

Linear phase modulation can result in better light efficiency and easier fabrication. Instead of using 8-level flat steps and 1 μm gaps to modulate the phase profile of a conventional diffractive liquid crystal lens, the harmonic diffractive liquid crystal lenses can use 8 or fewer sectors in each zone to linearly modulate the phase profile of the harmonic diffractive liquid crystal lens (FIG. 3B). This is achieved by using 9 (or 5) narrow low-resistance ring electrodes (about 5 μm in width) covered by a uniform high-resistance transparent indium tin oxide (ITO) thin film. An advantage is that the new phase profile is much closer to the ideal lens phase profile and hence the optical performance can be improved and maintained for a larger aperture lens. Referring to Table 1, all the lenses that cannot be achieved based on the conventional diffractive liquid crystal lens concept can now be accomplished based on the harmonic diffractive liquid crystal lens in accordance with some embodiments of the present disclosure.

By changing the slope of the applied voltage, both positive and negative powers can be realized in the harmonic diffractive liquid crystal lenses, such that the power of the lens can be tuned to different values such as plano, +αD, −αD. The chromatic aberration of the conventional diffractive liquid crystal lens[63] is reduced for the harmonic diffractive liquid crystal lenses as the harmonic diffractive liquid crystal lenses can focus multiple wavelengths constructively. The harmonic diffractive liquid crystal lenses are relatively thin (only about 13 μm) and hence the response is fast. These properties make the harmonic diffractive liquid crystal lenses attractive for correction of presbyopia.

Figure 4A:
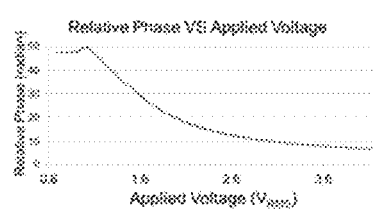
FIGS. 4A-4D show aspects of a HDLC lens design in accordance with embodiments of the present disclosure.

The goal of the design of the large-aperture tunable harmonic diffractive liquid crystal lens design is to maximize the light efficiency by optimizing the phase profile in each zone. FIG. 4A shows the phase modulation of a 20 μm-thick cell using a commercial liquid crystal material, indicating that 40 radians phase change can be achieved with less than 3 Vrms. From FIG. 3B, only the central region has more changes of the slopes of the phase profile, so for the inner few zones eight linear sectors are used for more accurate linear phase modulation and for the outer zones four linear sectors are used.

Figure 4B:
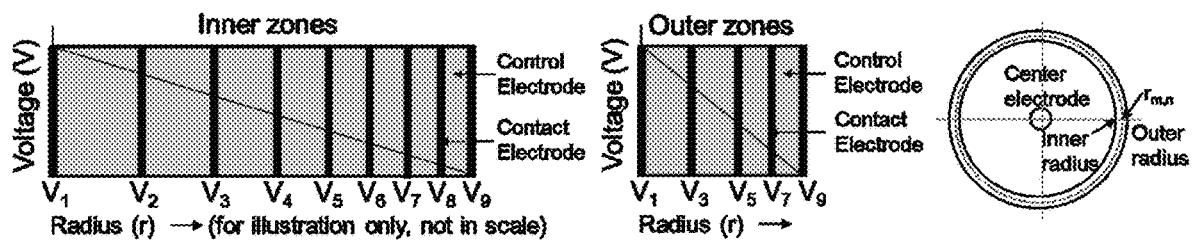
Figure 4C:
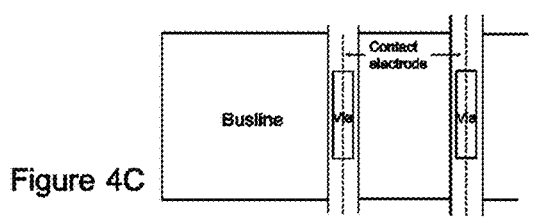
Figure 4D:
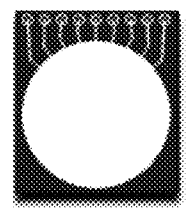

FIG. 4B illustrates the details of the implementation plan of linear phase modulation in each zone shown in FIG. 3B. The contact electrodes are located at the boundary of two neighboring subzones and as an example, its width is chosen as δ μm. If the outer radius of mth zone and nth subzone is $r_{m,n}$, the inner radius and the outer radius of the contact electrodes are $r_{m,n}-\delta/2$ and $r_{m,n}+\delta/2$ respectively. At the boundary of each zone, two contact electrodes are needed. For the inner zones, 9 voltages $V_1$ through $V_9$ are applied to each contact ring electrode and for the outer zones, 5 voltages $V_1$, $V_3$, $V_5$, $V_7$, and $V_9$ are used. High-resistance ITO is covered on top of the contact electrodes. Both the contact electrodes and the high-resistance ITO are transparent. Connections between the buslines and the contact ring electrodes are made based on this mechanism. FIG. 4C shows the design of the vias and buslines. FIG. 4D illustrates the large-aperture (e.g., 30 mm-diameter) microstructured electrodes substrate with 9 buslines. Separate bus lines may be used for inner and outer zones. Based on these parameters and structures, the voltage drops in each subzone and each zone can be analyzed, which will be transformed to effective refractive index of the liquid crystals at each local area and then to the phase values. Using the phase profile and Fresnel diffraction theory, the light efficiency at the focal plane can be simulated. Based on this simulation, the location of transition from 8 sectors to 4 sectors can be determined. The efficiency of the lens will be maintained above 90%. Please know that all the numbers here are just for illustration of the design concept, and they can be changed as needed, including the number of linear phase sectors in each zone. The linear voltage drop may also be achieved using other formats of resistors.

In order to apply different voltages to each ring, electrical lines are fabricated on top of the ring electrode pattern and an insulating layer with ITO filled holes (vias) is created to connect the corresponding rings and electrical lines.

The current commercially available nematic liquid crystals (NLC) only respond to one of the two orthogonal polarization components of the natural light. Accordingly, liquid crystal materials with isotropic structure that are polarization independent, which are termed blue-phase liquid crystals (BPLCs),[64-68] are needed, particularly polarization-independent blue-phase liquid crystal materials with large birefringence (around 0.3), low voltage (<10Vrms), fast response (sub millisecond), low hysteresis, and operation at room temperature. The blue-phase liquid crystal materials will also allow alternative methods for design and fabrication of the harmonic diffractive liquid crystal lenses.

Example 2

One natural phenomenon of the human eye as it ages is the loss of accommodation by the crystalline lens. The accommodative ability of the eye drops almost linearly from well above 10 diopters (D) to 1 D by the age of 50-60. Almost everyone starts to have difficulty in near-vision tasks around 45 years of age. This condition, termed presbyopia,[1-9] is increasingly important in the US due to the lengthening of life expectancy. About 42% of American adults (the 78 million 'baby boomers' born between 1946 and 1964) are presbyopic, and the number of cases will keep increasing. To care for the vision of such a large population is of great value in terms of socioeconomic cost, academic research, and technology commercialization.

Spectacle correction of age-related optical changes in the eye has been increasingly important. With aging, the eye's lens loses some of its elasticity and becomes less able to focus incoming light. The result is that the eye has difficulty switching between focusing on a near object and a distant object, a condition called presbyopia. To correct for this condition, various eyeglasses, including bifocal, trifocal, or progressive spectacle, contact and intraocular lenses[10-12] have been developed to enable the eye to focus on both near and distant objects by looking through a different section of the lens, an approach referred to as area division. With the exception of the lens for 'simultaneous vision',[10] the field of view for each type of vision is generally limited to a narrow corridor. Some bifocal or multifocal contact and intraocular lenses use the simultaneous vision concept, where light is equally diffracted into several orders and each order corresponds to a focal length. The light efficiency is low for each vision task and the patient selectively suppresses the most blurred images that are not desired for a given task. Another choice is to use mono-vision lenses by which different focusing power is provided to each eye, one for near and the other for distant objects. However, in this case, the binocular depth perception is affected.

Ophthalmic lenses will be more capable and attractive if one could change their focusing power.[13-15] Fluidic adaptive lenses have been demonstrated, where the shape of the surface can be changed mechanically[16] or electro-optically.[17-20] The mechanical method uses a syringe pump to push or pull the liquid, and once the shape gives the desired power for a vision task, the syringe needs to be removed; so it cannot be used for adaptive vision correction in a timely manner. An electrically controllable focusing lens based on electrowetting effect[21-23] works only for a small aperture (<5 mm) and the shape of the liquid is sensitive to the external vibrations. Another kind of adaptive spectacle eyeglass that was brought to market by Adlens and FocusSpecs is based on the concept of Alvarez lens.[24] There are several issues with this eyeglass: the optical power is not uniform across the doublet, especially towards the periphery at larger field angles (about 20°); errors induced during manufacturing may cause the actual performance to differ from the expected; shifting of the two elements in the undesired lateral direction due to mounting will result in unexpected power, etc. But it could be an alternative option for vision assessment through accurate alignment.[25]

Figure 1B:
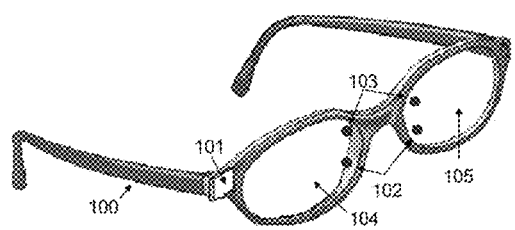
FIG. 1B is a schematic of a smart eyeglass with an eye tracking sensor and intelligent lens driver and controller, in accordance with an embodiment of the present disclosure.

In contrast, liquid crystal (LC) varifocal lenses provide the best stability and optical performance.[26-27] An electroactive lens allows for a greater field of view and voltage controlled uniform optical power without mechanical motion. FIG. 1A-FIG. 1B compare correction of presbyopia using conventional lenses and the new liquid crystal eyeglass. The latter is an integration of techniques in liquid crystal lens development, liquid crystal materials, lens driver and controller (FIG. 1B).

A smart, compact, efficient harmonic diffractive liquid crystal lens driver and controller are utilized for truly adaptive eyeglass. The driver and controller also allow manual or automatic adjustment of focusing between different vision tasks. An artificial intelligent eye tracking sensor for estimating the gazing distance in real time can be incorporated.

Also described herein is a smart eyeglass driver and controller for automatic voltage control of the harmonic diffractive liquid crystal lens for correction of presbyopia. An ARM microprocessor is embedded into the liquid crystal driver VLSI chip.[28] It implements the data processing for eye tracking sensor and sends commands to the lens driver to generate the multiple output voltages. The smart driver will also allow for a manual operation mode, where the corresponding voltages to be applied for each vision task are saved in the chip and the user only needs to press the button to switch the power.

Figure 5A:
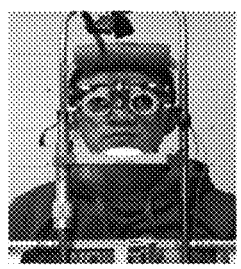
FIGS. 5A-FIG. 5D show aspects of an eye tracking sensor.
Figure 5B:
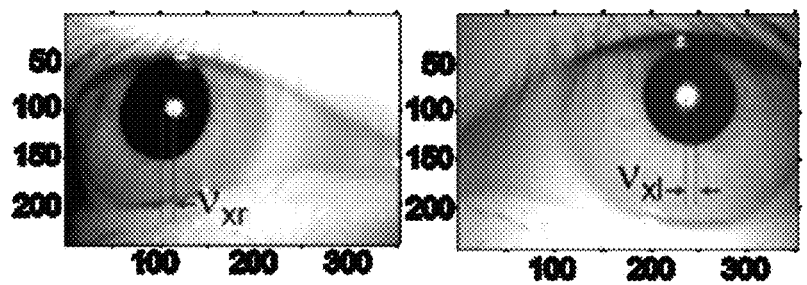
Figure 5C:
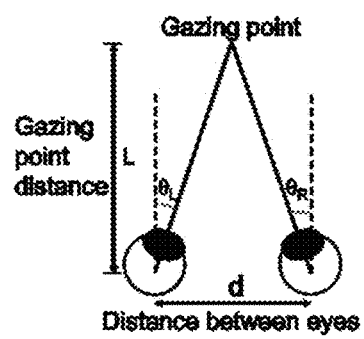
Figure 5D:
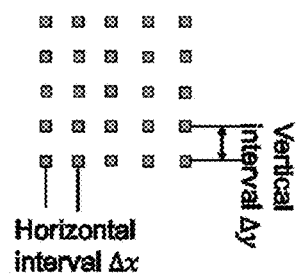

Also described herein is an eye tracking sensor for measuring the distance between the viewer and the objects.[29-30] The sensor can be used for an autofocus eyeglass. The distance information is used to determine the optical power that is needed for the electro-optic eyeglass to provide, and then the proper voltages can be applied to the adaptive lens. For each eye, one LED light source 102 and one mini-CMOS sensor 103 are mounted in the frame of the eyeglass (FIG. 1B and FIG. 5A) and used to take the back reflected image from the pupil and the cornea (FIG. 5B). By proper image processing and calibration of the vergence, the distance between the viewer and the objects can be estimated in real time (FIG. 5C and FIG. 5D). From each of the two images, the distance between the center of the glint and the center of the pupil in the horizontal direction ($v_{xl}$ for the left eye and $v_{xr}$ for the right eye) can be detected (FIG. 5B). In order to make the image processing robust, the shape of the pupil is considered an ellipse. Each gazing point corresponds to two angles, $\theta_L$ and $\theta_R$, for the left eye and the right eye respectively. The relation between the gazing angles $\theta$ and the distance v can be approximated as $\theta_L = b_0 + a_0 v_{xl}$, $\theta_R = b_1 + a_1 v_{xr}$. The parameters a and b are calibrated using known targets at near (~35 cm), intermediate (~70 cm), or distance (~4m). The distance of the unknown objects can be estimated based on the vergence angles: $L = d/(\tan \theta_L + \tan \theta_R)$. Deep learning algorithms can be applied for estimation of the gazing points too.

The large-aperture high-performance harmonic diffractive liquid crystal lenses and the compact high-efficiency smart lens driver can be assembled on a custom manufactured frame as the prototype of the new eyeglass for presbyopia. The smart lens driver includes the eye tracking sensor, a low-power ARM microprocessor, and the multichannel voltage generation chip. The smart driver has two operation modes, manual and automatic. In the manual mode, the corresponding voltages to be applied for each of the three vision tasks for the particular user are saved in the microprocessor and the user only need to press the button at most three times to generate one of three sets of multi-channel voltages. In the autofocus mode, the eye tracking sensor is activated and the microprocessor automatically determines in real time the optical power to be created and send commands to the multichannel voltage generation chip.

For myopic and hyperopic presbyopia, the harmonic diffractive liquid crystal lens can be embedded in the conventional lens for correction of myopia or hyperopia. The smart eyeglass can be used in the same way as described above.

Example 3

Figure 6:
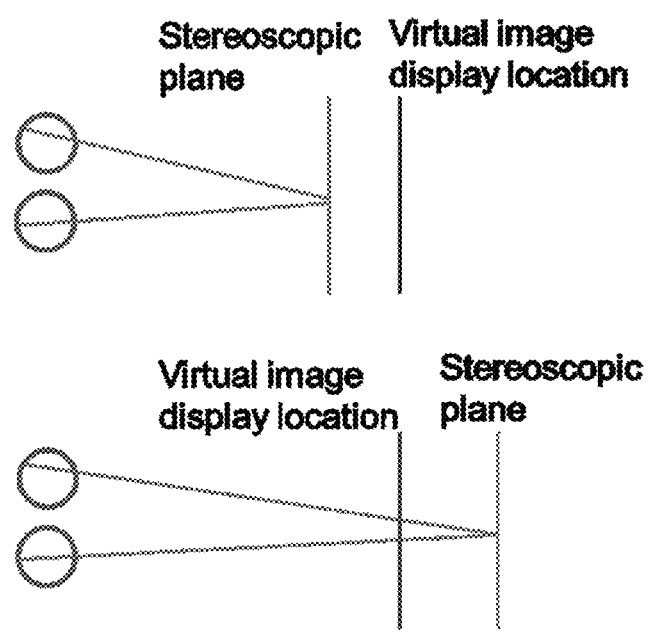
FIG. 6 is a schematic illustration of vergence-accommodation conflict in 3 D image display.

Wearable virtual reality (VR) displays and augmented reality (AR) displays can be widely used in entertainment, education, health care, low vision treatment, etc. The current commercially available VR and AR devices display the images at a fixed location and the two eyes are accommodated to that location. However, the stereoscopic image plane varies in real time and this plane is different from the accommodated plane, as shown in FIG. 6. This phenomenon is called vergence-accommodation conflict.[69] Long time use of the eyewear results in fatigue. In order to overcome this issue, adaptive lenses can be used to display the images at different depths as the objects appear in the real world. In this way, natural 3 D vision can be provided. The large-aperture adaptive lenses in accordance with various embodiments described herein and their extensions can be applied for this implementation.

CONCLUSION

The various embodiments described above are provided by way of illustration only and should not be construed to limit the scope of the present disclosure. Those skilled in the art will readily recognize that various modifications and changes may be made to the present disclosure without following the example embodiments and implementations illustrated and described herein, and without departing from the spirit and scope of the disclosure and claims here appended and those which may be filed in non-provisional patent application(s). Therefore, other modifications or embodiments as may be suggested by the teachings herein are particularly reserved.

REFERENCES

1. C. E. Letocha, The invention and early manufacture of bifocals, Survey of Ophthalmol. 35, 226 (1990).
2. T. Callina, T. P. Reynolds, Traditional methods for the treatment of presbyopia: spectacles, contact lenses, bifocal contact lenses, Ophthalmol. Clin. N. Am. 19, 25 (2006).
3. P. S. Soni, R. Patel, and R. S. Carlson, Is binocular contrast sensitivity at distance compromised with multifocal soft contact lenses used to correct presbyopia? Optom. Vis. Sci. 80, 505 (2003).
4. E. S. Bennett, Contact lens correction of presbyopia, Clin. Exp. Optom. 91, 265 (2008).
5. G. M. Morris and L. T. Nordan, Phakic intraocular lenses, Opt. Photon. News, 27 (September 2004).
6. W. N. Charman, Developments in the correction of presbyopia I: spectacle and contact lenses. Ophthalmic and Physiological Optics 34, 8-29 (2014).
7. W. N. Charman, Developments in the correction of presbyopia II: surgical approaches. Ophthalmic and Physiological Optics 34, 397 (2014).
8. https://snappgroup.org/prebyopia-is-expected-to-timpact-billions-worldwide/.

9. W. N. Charman, Non-surgical treatment options for presbyopia, Expert Review of Ophthalmology 13, 219 (2018).
10. J. A. Futhey, Diffractive bifocal intraocular lens, Proc. SPF 1052, 142 (1989).
11. P. B. Morgan, N. Efron, B. Woods, et al. The international contact lens prescribing consortium. An international survey of contact lens prescribing in presbyopia, Clin Exp Optom. 94, 87 (2010).
12. V. Verma, A. Rawat, Eyewear Market size to exceed $180 bn by 2024, https://www.gminsights.com/pressrelease/eyewear-market-report.
13. G. Smith, D. A. Atchison, The eye and visual optical instruments, Cambridge University Press, 1997.
14. G. Vdovin, M. Loktev, A. Naumov, Opt. Express 11, 810 (2003).
15. A. W. Lohmann, Appl. Opt. 9, A new class of varifocal lenses, 1.669 (1970) H. J. Caulfield, The Alvarez-Lohmann lens as a do-nothing machine," Opt. Laser Tech. 34, 1 (2002).
16. D.-Y. Zhang, V. Lien, Y. Berdichevsky, J. Choi, and Y.-H. Lo, Fluidic adaptive lens with high focal length tenability, Appl. Phys. Lett. 82, 3171 (2003).
17. H. Fang, G. Li, Adaptive liquid lens actuated by electromagnetic solenoid, Frontiers in Optics 2010 (OSA Annual Meeting), Rochester, N.Y., paper FThU1.
18. G. Li, Electro-optic lenses for correction of presbyopia, Investigative Ophthalmology & Visual Science 54, 4279 (June 2013).
19. G. Li, Z. Han, and G. Lan, Adaptive Electro-Optic Lenses for Vision Correction and Assessment, and Eye Imaging, Investigative Ophthalmology & Visual Science 53, 3584 (2012).
20. G. Lan and G. Li, Design of high-performance adaptive objective lens with large optical depth scanning range for ultrabroad near infrared microscopic imaging, Biomedical Optics Express 6, 3362-3377 (2015).
21. B. Berge and J. Peseux, Variable focal lens controlled by an external voltage: an application of electrowetting, Eur. Phys. J. E 3, 159 (2000).
22. T. Krupenkin, S. Yang, and P. Mach, "Tunable liquid microlens," Appl. Phys. Lett. 82, 316-318 (2003).
23. Kuiper S and Hendriks B H W, Variable-focus liquid lens for miniature cameras, Appl. Phys. Lett. 85 1128-30 (2004).
24. H. Radhakrishnan and W. N. Charman, Optical characteristics of Alvarez variable-power spectacles, Ophthal. & Physiological Opt. 37, 284 (2017).
25. G. Li and Z. Li, Adaptive Alvarez Lens for Vision Assessment and Correction, Investigative Ophthalmology & Visual Science 58, 1273 (2017).
26. G. Li, Adaptive lens, Progress in Optics 55, 199 (2010).
27. G. Li, Low-cost adaptive lens for vision correction, Investigative Ophthalmology & Visual Science 55, 5973 (2014).
28. H. Deng and G. Li, A high-efficiency low-power IC-based CMOS liquid crystal driver for tunable electro-optic eyewear, Electronics 8, 14 (2019).
29. Z. Li, G. Li, Eye Tracker with Distance Measurement for Autofocus Eyeglass, Investigative Ophthalmology & Visual Science 57, 3129 (2016).
30. Z. Li and G. Li, Automatic object distance measurement based on eye tracker for adaptive eyewear, Ophthalmic Technology, Photonics West, San Francisco, paper 10045-68, 2017.
31. S. Sato, A. Sugiyama, and R. Sato, Variable-focus liquid crystal Fresnel lens, Jpn. J. Appl. Phys. 24, L626 (1985).
32. L. G. Commander, S. E. Day, D. R. Selviah, Variable focal length microlenses, Opt. Commun. 177, 157 (2000).
33. V. Presniakov, T. Galstian, Asatryan, A. Tork, A. Bagramyan, A. Zohrabyan, Liquid crystal device and method of fabrication thereof, US 2009/0316097.
34. S. T. Kowel, D. S. Cleverly, and P. G. Kornreich, Focusing by electrical modulation of refraction in a liquid crystal cell, Appl. Opt. 23, 278 (1984).
35. A. Nouhi and S. T. Kowel, Adaptive spherical lens, Appl. Opt. 23, 2774 (1984).
36. A. F. Naumov, M. Yu. Loktev, I. R. Guralnik, G. Vdovin, Liquid-crystal adaptive lens with modal control, Opt. Lett. 23, 992 (1998).
37. M. Y. Loktev, V. N. Belopukhov, F. L. Vladimirov, G. V. Vdovin, G. D. Love, A. F. Naumov, Wave front control systems based on modal liquid crystal lenses. Rev. Sci. Instrum. 71, 3190 (2000).
38. N. A. Riza, M. C. DeJule, Three-terminal adaptive nematic liquid-crystal lens device, Opt. Lett. 19, 1013 (1994).
39. P. W. McOwan, M. S. Gordon, W. J. Hossack, A switchable liquid crystal binary Gabor lens, Opt. Commun. 103, 189 (1993).
40. B. Wang, M. Ye, and S. Sato, Lens of electrically controllable focal length made by a glass lens and liquid-crystal layers, Appl. Opt. 43, 3420 (2004).
41. W. Klaus, M. Ide, Y. Hayano, S. Morokawa, Y. Arimoto, Adaptive LC lens array and its application, Proc. SPIE 3635, 66 (1999).
42. Y. Sun, G. P. Nordin, S. T. Kowel, B. Wang, Development of liquid crystal adaptive lens with circular electrodes for imaging application, Proc. SPIE 4987, 209 (2003).
43. H. Ren and S.-T. Wu, Appl. Phys. Lett. 81, Inhomogeneous nanoscale polymer-dispersed liquid crystals with gradient refractive index, 3537 (2002).
44. H.-S. Ji, J.-H. Kim, S. Kumar, Electrically controllable microlens array fabricated by anisotropic phase separation from liquid-crystal and polymer composite materials, Opt. Lett. 28, 1147 (2003).
45. V. V. Presnyakov and T. V. Galstian, Electrically tunable polymer stabilized liquid-crystal lens, J. Appl. Phys. 97, 103101 (2005).
46. T. Nose, S. Masuda, S. Sato, J. Li, L. Chien, P. J. Bos, Effects of low polymer content in a liquid-crystal microlens, Opt. Lett. 22, 351 (1997).
47. L. Li, V. Heugten, D. Duston, P. Bos, D. Bryant, Double-layer electrode for electro-optic liquid crystal lens, U.S. Pat. No. 9,625,767 (April 2017).
48. W. N. Charman, Can diffractive liquid crystal lenses aid presbyopes? Ophthalmic and Physiological Optics 13, 427 (1993).
49. G. Williams, N. J. Powell, and A. Purvis, Electrically controllable liquid crystal Fresnel lens, Proc. SPIE 1168, 352 (1989).
50. J. S. Patel and K. Rastani, Electrically controlled polarization-independent liquid-crystal Fresnel lens arrays, Opt. Lett. 16, 532 (1991).
51. H. Ren, Y.-H. Fan, S.-T. Wu, Tunable Fresnel lens using nanoscale polymer-dispersed liquid crystals, Appl. Phys. Lett. 83, 1515 (2003).
52. C. W. Fowler and E. S. Pateras, Liquid crystal lens review, Ophthal. Physiol. Opt. 10, 186 (1990).
53. G. Li, D. L. Mathine, P. Valley, P. Äyräs, J. Schwiegerling, B. Kippelen, S. Honkanen, and N. Peyghambarian, 54. G. Li, P. Valley, M. S. Giridhar, D. L. Mathine, G. Meredith, J. N. Haddock, B. Kippelen, and N. Peyghambarian, Large-aperture switchable thin diffractive lens with interleaved electrode pattern, Appl. Phys. Lett. 89, (October 2006).
55. G. Li, P. Valley, P. Äyräs, S. Honkanen, and N. Peyghambarian, High-efficiency switchable flat diffractive ophthalmic lens with three-layer electrode pattern and two-layer via structures, Appl. Phys. Lett. 90, No. 10, 111105 (2007).
56. G. Li, D. Mathine, P. Valley, P. Äyräs, J. Haddock, M. Giridhar, J. Schwiegerling, G. Meredith, B. Kippelen, S. Honkanen, N. Peyghambarian, Switchable Diffractive Lens for Vision Correction, Optics & Photonics News, "Optics in 2006", 28 (December 2006).
57. G. Li, US patent 2006/0164593 Adaptive electro-optic lens with variable focal length.
58. G. Li (invited), High-efficiency electro-optic diffractive lens, SPIE Symposium on Optics & Photonics, Conference 6310, Aug. 14, 2006, San Diego, Calif.
59. G. Li, (invited), Switchable electro-optic eyewear, SPIE Symposium on Optics & Photonics, Conference 6332, Aug. 13, 2006, San Diego, Calif.
60. G. Li (invited), Liquid crystal lenses for correction of presbyopia, Sixth International Workshop on Adaptive Optics in Industry and Medicine, Jun. 12-15, 2007, Galway, Ireland.
61. G. Li, Adaptive Lens for Vision Correction. U.S. Pat. No. 8,587,734 B2, 8 Mar. 2010. International Patent WO102295A1, 8 Mar. 2010.
62. G. Li, A new method for characterization of transverse chromic aberration of ophthalmic lens, Invest. Ophthal. & Vis. Sci. 51, 3944 (April 2010).
63. S. K. Manna, L. Dupont, G. Li, Isotropic elastic stress induced large temperature range blue phase at room temperature, J. Phy. Chem. C 120, 17722 (2016).
64. H. Ren, Y. H. Fan, S. T. Wu, Polymer network liquid crystals for tunable microlens arrays. *J. Phys. D Appl. Phys.* 37, 400-403 (2004).
65. T.-H. Lin, C.-W. Chen, Q. Li, Self-organized 3 D photonic superstructures: liquid crystal blue phase, Chapter 14 in *Anisotropic Nanomaterials: Preparation, Properties, and Applications*, Li, Q., Ed., Springer, Heidelberg, 2015.
66. H. Kikuchi, M. Yokota, Y. Hisakado, H. Yang, T. Kajiyama, Polymer-stabilized liquid crystal blue phases, *Nat. Mater.* 1, 64-68 (2002).
67. L. Wang, Q. Li, Stimuli-directing self-organized 3 D liquid crystalline nanostructures: from materials design to photonic applications, *Adv. Funct. Mater.* 26, 10-28 (2016).
68. Z. Zheng, C. Yuan, W. Hu, H. K. Bisoyi, M. Tang, Z. Liu, P. Sun, W. Yang, X. Wang, D. Shen, Y. Li, F. Ye, Y. Lu, G. Li, Q. Li, Light-patterned crystallographic direction of a self-organized three-dimensional soft photonic crystal. *Adv. Mater.* 29, 1703165 (2017).
69. G. Kramida, Resolving the vergence-accommodation conflict in head-mounted displays, IEEE Transactions on Visualization and Computer Graphics 22, 1912-1931 (2016).

What is claimed is:

1. A system for correction of vision of a subject, comprising: a lens having a linearly modulated phase profile, wherein the lens is configured as harmonic diffractive liquid crystal lens; an eye tracking sensor configured to measure distance between a viewer and an object; a processor configured to determine, based on the measured distance, a desired optical power of the lens for the viewer to focus on the object; and a voltage generator configured to generate a voltage to apply to the lens to provide the desired optical power.

2. The system of claim 1, wherein the lens, eye tracking sensor, processor, and voltage generator are disposed on and/or in wearable eyeglasses for the subject.

3. The system of claim 1, wherein the measured distance between the viewer and the object and desired optical power of the lens correspond to near distance vision, intermediate distance vision, or long distance vision.

4. The system of claim 1, wherein the eye tracking sensor, processor, and voltage generator are configured to, in combination, provide autofocus functions for correction of vision of the subject.

5. The system of claim 1, wherein the eye tracking sensor comprises at least one light source and at least one image sensor, configured to obtain a back-reflected image from the pupil and cornea.

6. The system of claim 1 for correction of vision of a subject, wherein the lens having a nonlinear phase profile which is achieved by sectors of the linearly modulated phase profile and a plurality of zones, wherein each of the zones comprises contact ring electrodes and control electrodes or resistors, and wherein the lens can provide both positive and negative tunable optical powers.

7. The system of claim 6, wherein the lens comprises inner zones with a plurality of linear sectors and outer zones with a plurality of the same number of linear sectors or fewer linear sectors.

8. The system of claim 6, wherein two contact ring electrodes are located at the boundary of each of the inner and outer zones.

9. The system of claim 6, wherein each of the contact ring electrodes is located proximate the boundaries of neighboring subzones of respective one of the inner and outer zones.

10. The system of claim 6, wherein the contact ring electrodes are configured to have low resistance.

11. The system of claim 6, wherein the contact ring electrodes are covered by a high-resistance material to create a sheet resistance and generate linear voltage drops.

12. The system of claim 6, wherein the control electrodes are configured to have a high-resistance.

13. The system of claim 6, wherein the contact ring electrodes are covered by a high-resistance indium tin oxide (ITO), ZnO, TiO2, or other transparent thin film, including polymers.

14. The system of claim 6, wherein the total phase change in each of the inner and outer zones is a multiple of $2\pi$ radians.

15. The system of claim 6, wherein a plurality of voltages are applied to the contact ring electrodes to tune the optical power of the lens.

16. The system of claim 6, wherein the plurality of voltages are applied such that changing the slope of the applied voltage produces different positive and/or negative optical power of the lens.

17. The system of claim 6, wherein the vision correction provided by the system is correction of presbyopia or correction of vergence-accommodation conflict in virtual reality display and augment reality display.

18. The system of claim 6, wherein the linear phase modulation in each of the sectors is implemented using thin film resistors or conductive ladder meshing, wherein there are two addressable electrodes and a thin film ITO (or other materials) strip between the two addressable electrodes are used to create linear voltage drops for each of the sectors in the conductive ladder meshing; and wherein a number of interpolating electrodes across the ITO strip receive the linear voltage drops.

19. The system of claim 6 applies to the tunable prism, which can be used in any optical system and for treatment of strabismus and other low vision disease.

* * * * *